(12) United States Patent
Ruman et al.

(10) Patent No.: US 6,622,481 B1
(45) Date of Patent: Sep. 23, 2003

(54) EXHAUST TREATMENT DEVICE FOR AN INTERNAL COMBUSTION ENGINE

(75) Inventors: Mark A. Ruman, Fond du Lac, WI (US); Ronald J. Donahue, Fond du Lac, WI (US); David D. Liegeois, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/098,077

(22) Filed: Mar. 14, 2002

(51) Int. Cl.[7] .................................................. F01N 3/00
(52) U.S. Cl. .............................. 60/298; 60/282; 60/302; 60/323; 60/324
(58) Field of Search .......................... 60/282, 272, 289, 60/308, 302, 321, 322, 323, 324

(56) References Cited

U.S. PATENT DOCUMENTS

| | | | | |
|---|---|---|---|---|
| 2,611,238 A | * | 9/1952 | Fryer, Jr. ...................... | 60/323 |
| 3,413,803 A | * | 12/1968 | Rosenlund et al. ............ | 60/282 |
| 3,722,221 A | * | 3/1973 | Chopin et al. ................. | 60/282 |
| 3,727,410 A | * | 4/1973 | Scheitlin et al. .............. | 60/282 |
| 3,799,196 A | * | 3/1974 | Scheitlin et al. .............. | 60/282 |
| 3,826,089 A | | 7/1974 | Nakajima et al. ............. | 60/290 |
| 3,898,802 A | * | 8/1975 | Tadokoro et al. .............. | 60/282 |
| 3,902,853 A | | 9/1975 | Marsee et al. ................. | 23/277 |
| 3,911,676 A | | 10/1975 | Jensen .......................... | 60/301 |
| 3,934,412 A | | 1/1976 | Masaki et al. ................. | 60/288 |
| 3,947,545 A | | 3/1976 | Ishida et al. ................. | 423/213 |
| 4,078,381 A | * | 3/1978 | Kumai .......................... | 60/282 |
| 4,658,580 A | * | 4/1987 | Schley et al. ................. | 60/323 |
| 5,305,603 A | * | 4/1994 | Baumann ...................... | 60/323 |

* cited by examiner

Primary Examiner—Thomas Denion
Assistant Examiner—Tu M. Nguyen
(74) Attorney, Agent, or Firm—William D. Lanyi (57) ABSTRACT

An exhaust treatment device is provided for an internal combustion engine of a marine propulsion system. An outer chamber contains a first inner chamber within it and slidably supports the inner chamber. An exhaust inlet conduit directs a stream of exhaust gases from a cylinder of the internal combustion engine directly into the inner chamber. The inner and outer chambers are supported relative to each other to allow relative movement of these two components in response to changes in the differential temperature between the two components. A rail system slidably supports the inner chamber relative to the outer chamber. The exhaust treatment device comprises a liquid cooled housing surrounding the inner and outer chambers. Exhaust gas is directed through the inner chamber and then into the outer chamber at a closed end of the exhaust treatment device. Exhaust gases then flow through the outer chamber to an exhaust conduit of the marine propulsion system.

18 Claims, 6 Drawing Sheets

EXHAUST TREATMENT DEVICE FOR AN INTERNAL COMBUSTION ENGINE

BACKGROUND OF THE INVENTION

1. Field of the Invention

The present invention is generally related to an exhaust treatment device for an internal combustion engine and, more particularly, to an exhaust treatment device for use in conjunction with an engine of a marine propulsion system in Which inner and outer chambers of the device are configured to advantageously direct a stream of exhaust gases through a high temperature region to oxidize certain elements within the exhaust stream.

2. Description of the Prior Art

Various types of exhaust treatment devices are known to those skilled in the art. Some exhaust treatment devices incorporate catalysts which advantageously affect the constituents of an exhaust stream while others provide a thermal reactor without the additional use of a catalyst bed.

U.S. Pat. No. 3,911,676, which issued to Jensen on Oct. 14, 1975, describes an exhaust system which comprises a two stage exhaust manifold reactor adapted to lower the nitrogen oxide, hydrocarbon and carbon monoxide content of exhaust gas of internal combustion engines. The first stage comprises a catalytic reactor housing connected proximate to the engine exhaust ports and containing a catalyst bed between spaced perforate retainers such that the host exhaust gas passes through the catalyst bed whereby nitrogen oxides are chemically reduced. Air is injected into the exhaust gas after traversing the catalyst bed. Air injection can be accomplished by one or more injection tubes having a plurality of openings in its side wall. Connected proximate to the catalytic reactor housing is a non-catalytic thermal oxidation reactor which receives the hot exhaust gas/air mixture and wherein hydrocarbon and carbon monoxide are oxidized.

U.S. Pat. No. 3,902,853, which issued to Marsee et al on Sep. 2, 1975, describes an exhaust converter for an internal combustion engine which comprises an outer housing rigidly connected directly to the exhaust outlets of the engine and a light weight flexibly constructed inner housing suspended inside the rigid outer housing. The inner housing contains a flexibly suspended catalyst container dividing it into an inlet plenum and a thermal non-catalytic reactor compartment. Air injection means are provided in the thermal reactor. The catalytic stage reduces nitrogen oxides and the thermal reactor oxidizes hydrocarbon and carbon monoxide. The light flexible construction of the inner housing allows it to expand and contract in response to thermal shock without destroying itself.

U.S. Pat. No. 3,826,089, which issued to Nakajima et al on Jul. 30, 1974, describes an air pollution preventive arrangement. The arrangement is intended for use with an internal combustion engine for motor vehicles, adapted to reduce the concentrations of noxious compounds such as unburned hydrocarbons and carbon monoxides contained in the engine exhaust gases. The arrangement comprises a thermal reactor for primarily recombusting the exhaust gases and a catalytic converter for secondarily recombusting the exhaust gases passed from the thermal reactor so as to oxidize the residual unburned compounds. An air injection unit supplies additional air which is mixed, in a limited proportion, to the exhaust gases entering the thermal reactor to aid in the primary recombustion of the exhaust gases therein. The noxious unconsumed hydrocarbons and carbon monoxides are thus converted into innocuous compounds at efficiencies which are far higher that those attained where the thermal reactor or the catalytic converter is employed independently.

U.S. Pat. No. 3,947,545, which issued to Ishida et al on Mar. 30, 1976, describes a purification system for exhaust gas. There are provided in the patent an improved thermal reactor apparatus for, an improved method of, purifying exhaust gases, particularly from a motor vehicle, wherein thermal oxidation and catalytic oxidation of the carbon monoxide and hydrocarbon contents of the exhaust gases and/or catalytic reduction of the nitrous oxide contents of the exhaust gases are effected within an environment such that at least some of the components of the reactor exposed to the exhaust gases are coated with and/or made of a catalytic alloy capable of acting as a catalyst for oxidation of the carbon monoxide and hydrocarbon contents of the exhaust gases and for reduction of the nitrous oxide contents of the exhaust gases.

U.S. Pat. No. 3,934,412, which issued to Masaki et al on Jan. 27, 1976, describes a thermal reactor for afterburning automotive internal combustion engine exhaust gases. Reaction heat generated by oxidation in presence of an oxidation catalyst maintains a sufficient afterburning temperature during low engine load operation.

The patents described above are hereby expressly incorporated by reference in the description of the present invention.

Many different types of reactors and catalyst systems are well known to those skilled in the art. These devices are used to reduce the amount of noxious elements in the exhaust stream of an internal combustion engine. Many different types of outboard motors and other marine propulsion systems are known to those skilled in the art.

Internal combustion engines used in conjunction with marine propulsion systems are cooled by drawing water from a body of water in which the marine propulsion system is operated, circulating that water in thermal communication either directly with the internal combustion engine or with a closed loop cooling system of the internal combustion engine, and then returning the water to the body of water from which it was drawn.

It would be beneficial if an internal combustion engine of a marine propulsion system could be provided with a reactor or catalyst device that is cooled by the normal cooling system of the engine and operated in such a way that internal temperatures of the reactor are maintained at a sufficiently high magnitude to promote oxidation and therefore efficiently decrease the amount of noxious components within the exhaust stream of the internal combustion engine. It would further be beneficial if such a device were constructed in a way that allows components having extremely different temperatures to be supported in such a way so as to reduce damage that might otherwise occur because of the expansions caused by extreme temperature differentials between components that are proximate to each other.

SUMMARY OF THE INVENTION

An exhaust treatment device for an internal combustion engine of a marine propulsion system, made in accordance with the present invention, comprises an outer chamber and a first inner chamber contained within the outer chamber and nonrigidly supported by the outer chamber through the use of sliding members. A first exhaust inlet conduit is disposed in fluid communication with the first inner chamber for directing a flow of exhaust gases into the first inner chamber from a location external to the exhaust treatment device. As a result of this structure, the first inner chamber can move relative to the outer chamber in response to changes in the temperature difference between the first inner chamber and the outer chamber.

A preferred embodiment of the present invention further comprises an outer support rail attached to the outer chamber and a first inner support rail attached to the first inner chamber and shaped to be received by the outer support rail. The outer support rail and first inner support rail are configured to cooperate with each other to slidably support the first inner chamber relative to the outer chamber. A first plurality of transfer passages is formed as part of the exhaust treatment device to provide fluid communication between the first inner chamber and the outer chamber.

A liquid cooled housing is attached to the internal combustion engine and the outer chamber is disposed within a cavity of the liquid cooled housing. A first end of the first inner chamber is disposed at a first end of the exhaust treatment device and a second end of the first inner chamber is disposed at a second end of the exhaust treatment device. The outer chamber is disposed in fluid communication with an exhaust conduit of the engine at the first end of the exhaust treatment device. The first plurality of transfer passages are formed in the wall of the first inner chamber at a location which is closer to the second end of the exhaust treatment device than to the first end of the exhaust treatment device.

A particularly preferred embodiment of the present invention further comprises a second inner chamber contained within the outer chamber and a second inner support rail attached to the second inner chamber and shaped to be received by the outer support rail. The outer support rail and the second inner support rail are configured to cooperate with each other to slidably support the second inner chamber relative to the outer chamber. A second plurality of transfer passages is formed as part of the exhaust treatment device to provide fluid communication between the second inner chamber and the outer chamber. Also, a second exhaust inlet conduit is disposed in fluid communication with the second inner chamber for directing a flow of exhaust gases into the second inner chamber. A first end of the second inner chamber is disposed at the first end of the exhaust treatment device and a second end of the second inner chamber is disposed at the second end of the exhaust treatment device. The second plurality of transfer passages are formed in a wall of the second inner chamber at a location which is closer to the second end of the exhaust treatment device than to the first end of the exhaust treatment device.

Certain embodiments of the present invention can further comprise a catalyst disposed within the first and second inner chambers.

BRIEF DESCRIPTION OF THE DRAWINGS

The present invention will be more fully and completely understood from a reading of the description of the preferred embodiment of the present invention in conjunction with the drawings, in which.

DESCRIPTION OF THE PREFERRED EMBODIMENT

Throughout the description of the preferred embodiment of the present invention, like components will be identified by like reference numerals.

Figure 1:
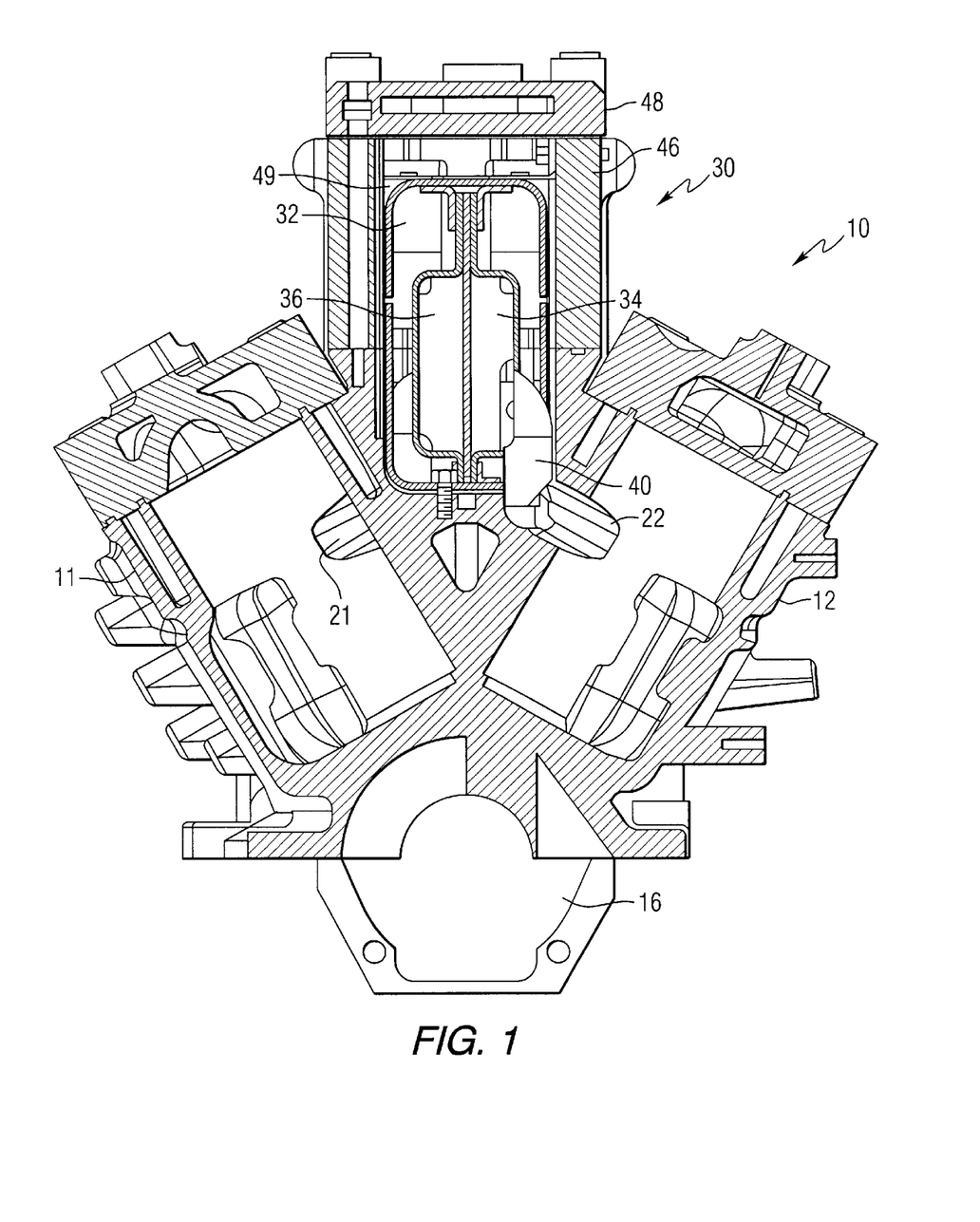
FIG. 1 is a section view-through an internal combustion engine and through the exhaust treatment device of the present invention.

FIG. 1 shows an internal combustion engine 10 having two banks of cylinders, 11 and 12, arranged in a V-configuration. For purposes of reference, a crankcase 16 is shown at one side of the engine 10. It should be understood that each side of the V-configuration can comprise a plurality of cylinders, such as three cylinders on each side to result in a V-6 engine configuration. The two representative cylinders shown in FIG. 1 each have an exhaust port, identified by reference numerals 21 and 22, respectively. Disposed within the V-configuration, between the two banks of cylinders, is an exhaust treatment device 30 that comprises an outer chamber 32 and a first inner chamber 34. Certain embodiments of the present invention further comprise a second inner chamber 36. The inner chambers, 34 and 36, are contained within the outer chamber 32 and are slidably supported by the outer chamber. A first exhaust inlet conduit 40 is disposed in fluid communication with the first inner chamber 34 for directing a flow of exhaust gases into the first inner chamber 34 from a location external to the exhaust treatment device 30, such as from the exhaust port 22 of one of the cylinders. As will be described in greater detail below, the first inner chamber 34 and the second inner chamber 36 can move relative to the outer chamber 32 in response to changes in the temperature difference between the inner chambers, 34 and 36, and the outer chamber 32. A liquid cooled housing, which comprises a plurality of walls 46 and a cover 48 is attached to the internal combustion engine 10 and the outer chamber 32 is disposed within a cavity 49 of the liquid cooled housing.

Figure 2:
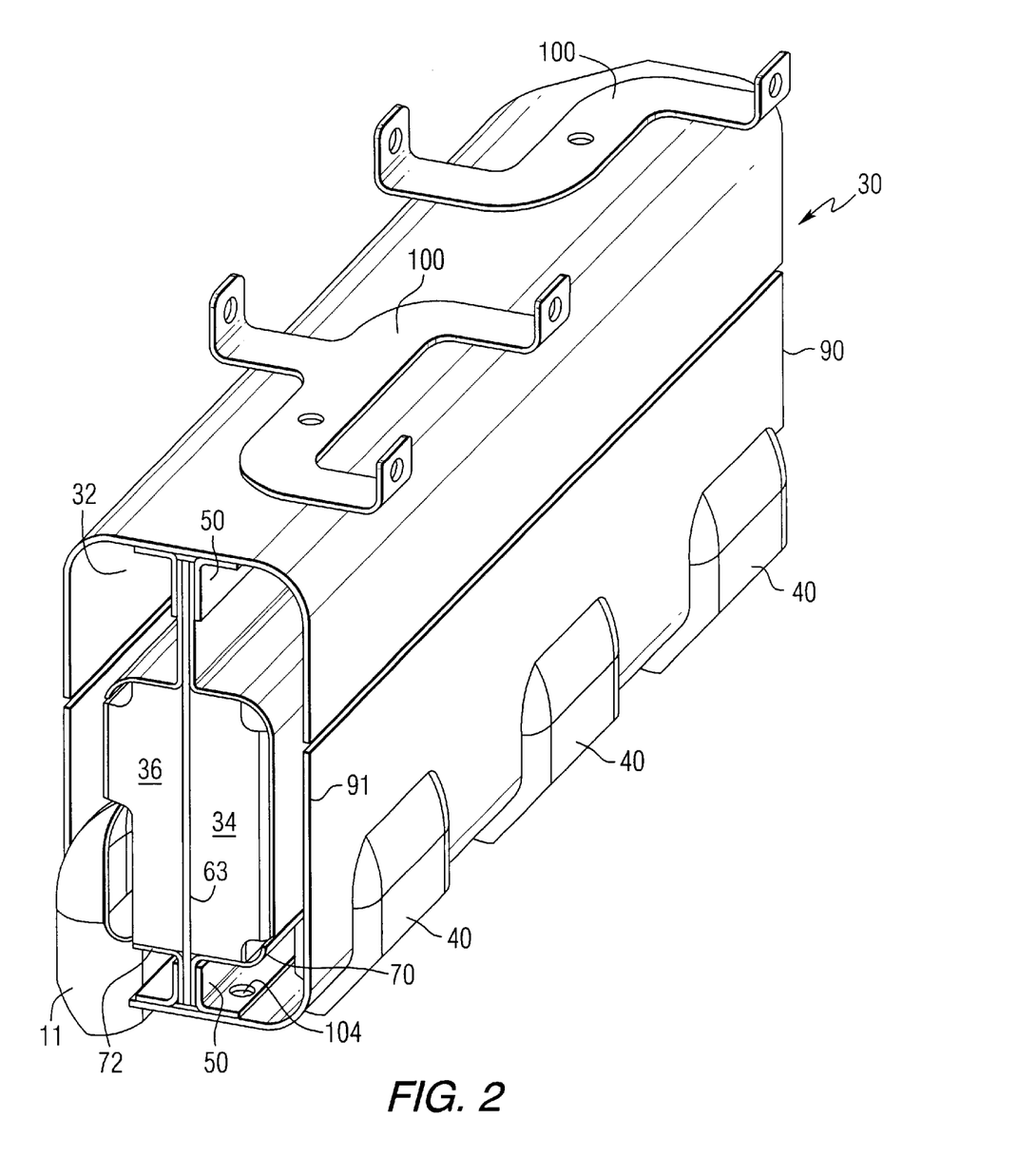
FIG. 2 is an isometric view of the exhaust treatment device of the present his invention.
Figure 3:
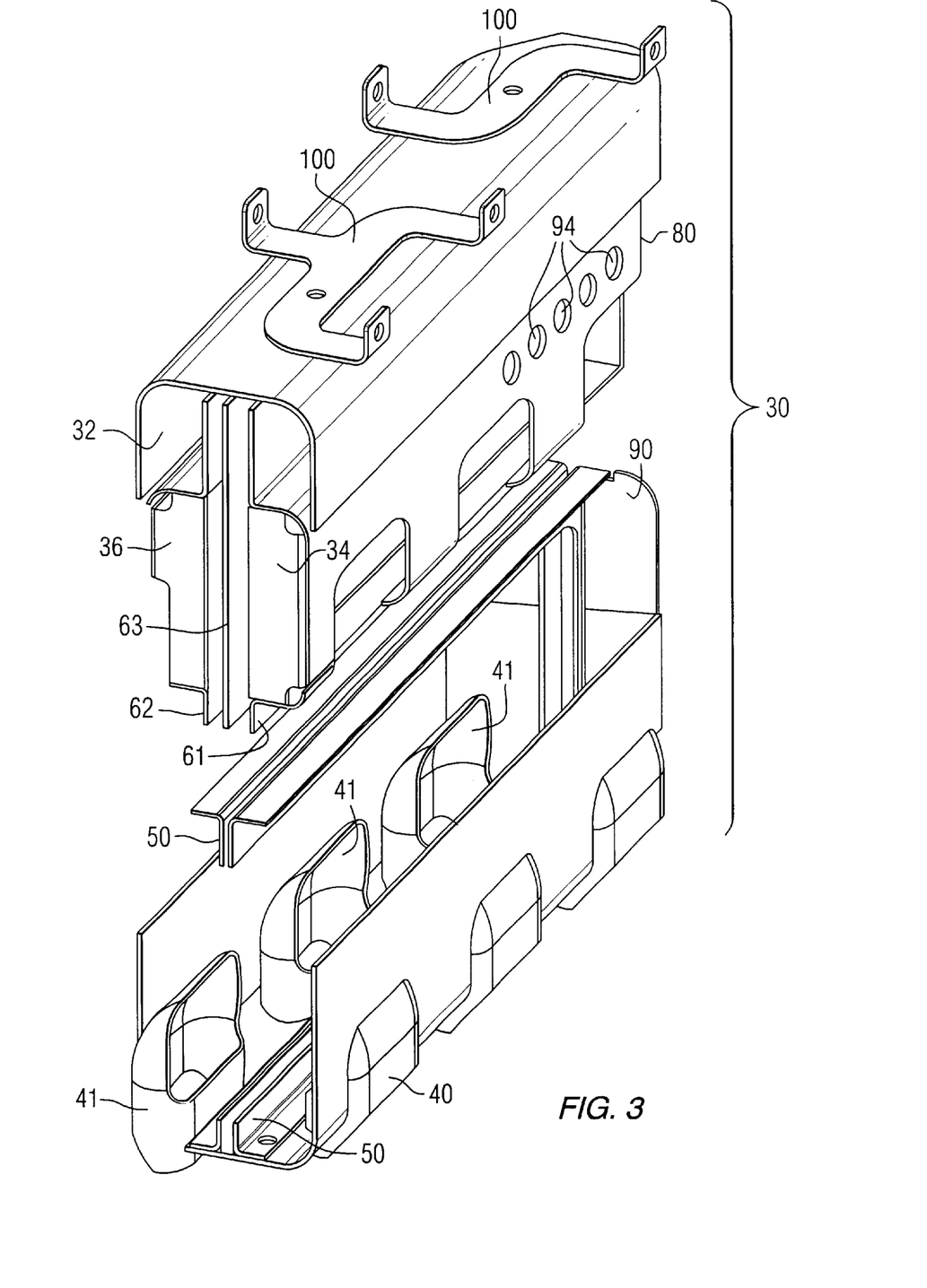
FIG. 3 is an exploded view of the device shown in FIG. 2.

FIG. 2 is an isometric view of the exhaust treatment device of the present invention removed from the liquid cooled housing which comprises the wall portion 46 and the cover portion 48, described above in FIG. 1. FIG. 3 is an isometric exploded view of the exhaust treatment device illustrated in FIG. 2.

With reference to FIGS. 2 and 3, first and second inner chambers, 34 and 36, are contained within the outer chamber 32. The first exhaust inlet conduit 40 is provided for each cylinder in one of the two banks of cylinders of the engine. As a result, the exhaust treatment device shown in FIGS. 2 and 3 contains three of the first exhaust inlet conduits. On the opposite side of the exhaust treatment device, three of the second exhaust inlet conduits 41 are provided.

With continued reference to FIGS. 2 and 3, an outer support rail 50 is attached to the outer chamber housing. With particular reference to FIG. 3, it can be seen that the outer support rail 50 extends along the internal surfaces of three walls of the exhaust treatment device. In FIG. 3, the outer support rail 50 is attached to the bottom internal surface, the top internal surface, and the back internal surface of the outer chamber. A first inner support rail 61 is attached to the first inner chamber 34 and shaped to be received by the outer support rail 50. The outer support rail and the first inner support rail are configured to cooperate with each other to slidably support the first inner chamber 34 relative to the outer chamber 32. The second inner chamber 36, which is also contained within the outer chamber 32, comprises a second inner support rail 62 which is attached to the second inner chamber 36 and shaped to be received by the outer support rail 50. It should be understood that, in a preferred embodiment, the outer support rail 50 comprises a channel between two parallel surfaces and the channel is shaped to receive both the first and second inner support rails, 61 and 62, therein in sliding association.

The exhaust treatment device 30 will be described herein with reference to a first end and a second end. The first end 70 of the first inner chamber 34 and the first end 72 of the second inner chamber 36 are disposed at a first end 91, or open end, of the exhaust treatment device 30. A second end 80 of the first inner chamber 34 and a second end of the second inner chamber 36, which is not visible in FIGS. 2 and 3, are disposed at a second end 90 of the exhaust treatment device 30. As will be described in greater detail below, the first end 91 of the exhaust treatment device will be disposed in fluid communication with an exhaust conduit of the marine propulsion system. A first plurality of transfer passages 94 are formed as part of the exhaust treatment device to provide fluid communication between the first inner chamber 34 and the outer chamber 32. Although not visible in FIGS. 2 and 3, a similar second plurality of transfer passages 95 are formed as part of the exhaust treatment device to provide fluid communication between the second inner chamber 36 and the outer chamber. The first and second plurality of transfer passages, 94 and 95, are formed in the walls of the first and second inner chambers, 34 and 36, at a location which is closer to the second end 90 of the exhaust treatment device than to the first end 91, or open end, of the exhaust treatment device.

With continued reference to FIGS. 2 and 3, it can be seen that a divider wall 63 separates the first and second inner chambers, 34 and 36, from each other. This divider wall 63 is particularly useful when the present invention is used in conjunction with a two cycle engine. The divider wall 63 separates the exhaust pressure pulses emanating from one bank of cylinders from the exhaust pulses emanating from the other bank of cylinders. This avoids any adverse effect on the appropriate tuning of the exhaust system in a two cycle engine.

The brackets 100 are attached to the exhaust treatment device 30 and allow it to be attached to the internal surfaces of the liquid cooled housing, which comprises the sidewall structure 46. In addition, a plurality of attachment holes 104 are formed in the bottom surface of the exhaust treatment device 30 to allow it to be attached to the engine block, as illustrated in FIG. 1.

Figure 4:
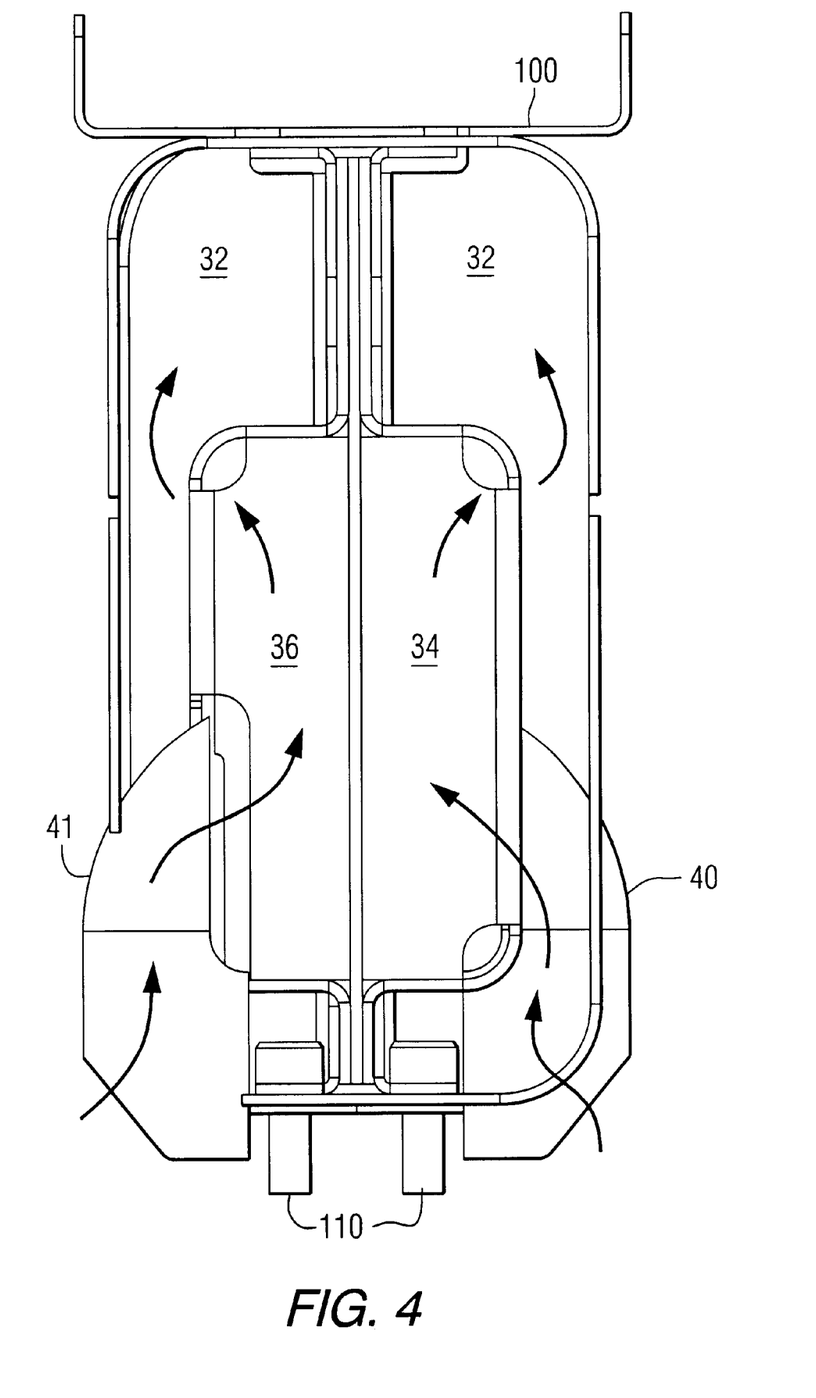
FIG. 4 is a section view through the exhaust treatment device.
Figure 5:
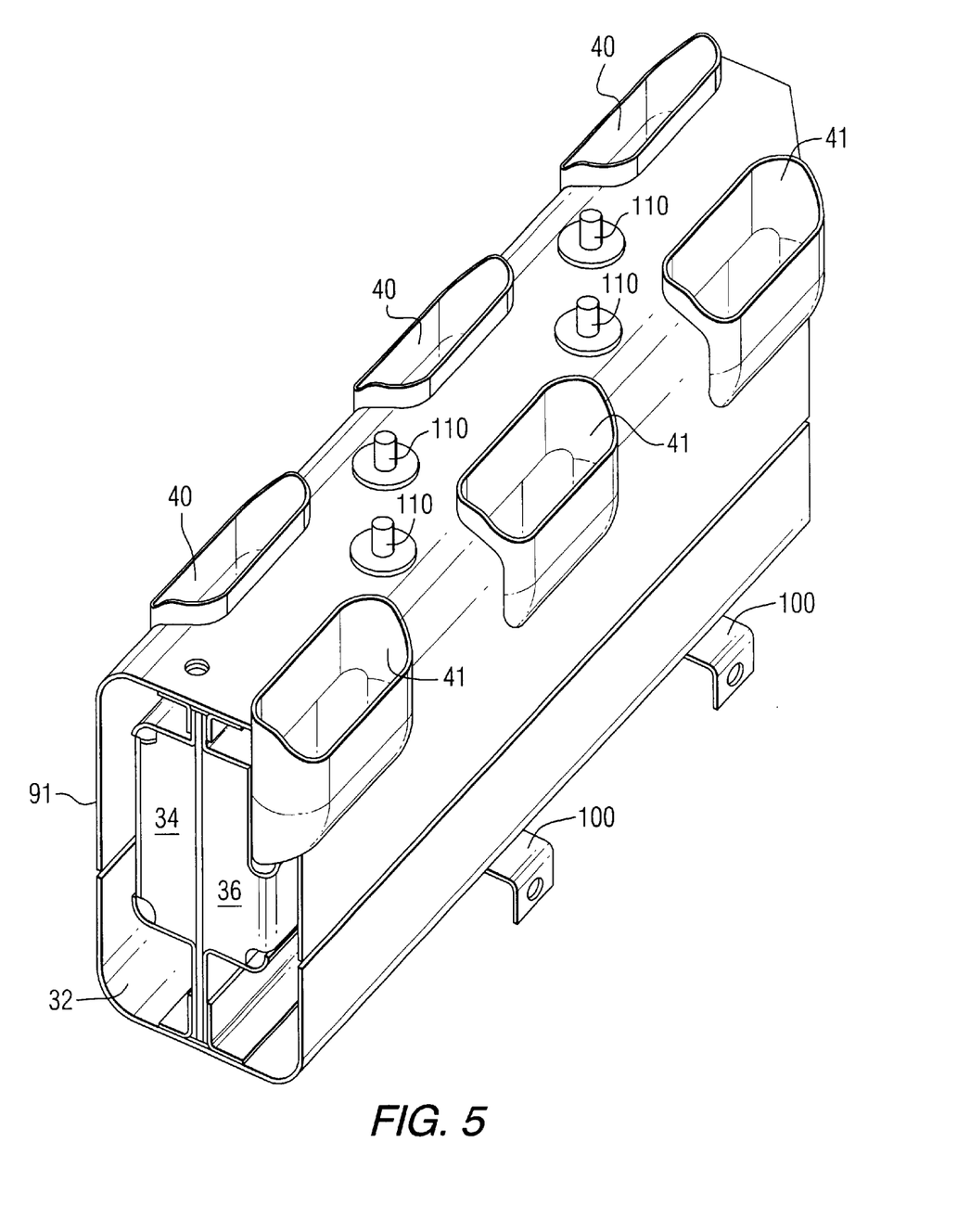
FIG. 5 is an isometric view taken from a side opposite to that of FIG. 2.

FIG. 4 is an end view of the exhaust treatment device and FIG. 5 is an isometric view of the exhaust treatment device showing the side of the device into which exhaust gases flow from the exhaust ports of an internal combustion engine.

With reference to FIGS. 4 and 5, the first and second exhaust inlet conduits, 40 and 41, allow exhaust gases to pass into the first and second inner chambers, 34 and 36, from the cylinders' exhaust ports without directly mixing with gases in the outer chamber 32. As represented by the arrows in FIG. 4, the exhaust gases pass initially into the first and second inner chambers, 34 and 36, and then out of the inner chambers through the first and second pluralities of transfer passages 94 and 95, as described above in conjunction with FIG. 3. Therefore, the exhaust gas passing into the first and second inner chambers must first flow to the second end of the inner chambers before flowing into the outer chamber 32 through the first and second plurality of transfer passages, 94 and 95. After the exhaust gases pass through the first and second plurality of transfer passages, they then travel in a direction from the second end 90 of the exhaust treatment device 30 toward the first end 91 and into an exhaust conduit 120 of the marine propulsion system, as will be described below in greater detail in conjunction with FIG. 6. The exhaust treatment device 30 creates a tortuous path through which the exhaust gases must travel. This allows further oxidation of certain noxious elements within the exhaust stream as the exhaust gases pass through the elevated temperatures of the first and second inner chambers, 34 and 36. With continued reference to FIGS. 4 and 5, the bracket 100 is used to attach the exhaust treatment device 30 to the inner surface of the liquid cooled housing which comprises the wall portion 46 and the cover portion 48 which are both illustrated in FIG. 1.

FIG. 5 is an isometric view which is inverted relative to the illustration of FIG. 2. The first and second exhaust inlet conduits, 40 and 41, are configured to be received by exhaust passages proximate the exhaust ports of the cylinders within the engine. In FIGS. 4 and 5, threaded fasteners, such as bolts 110, are used, in combination with bracket 100 to attach the exhaust treatment device 30 to the inner surfaces of the liquid cooled housing and to the engine block.

Figure 6:
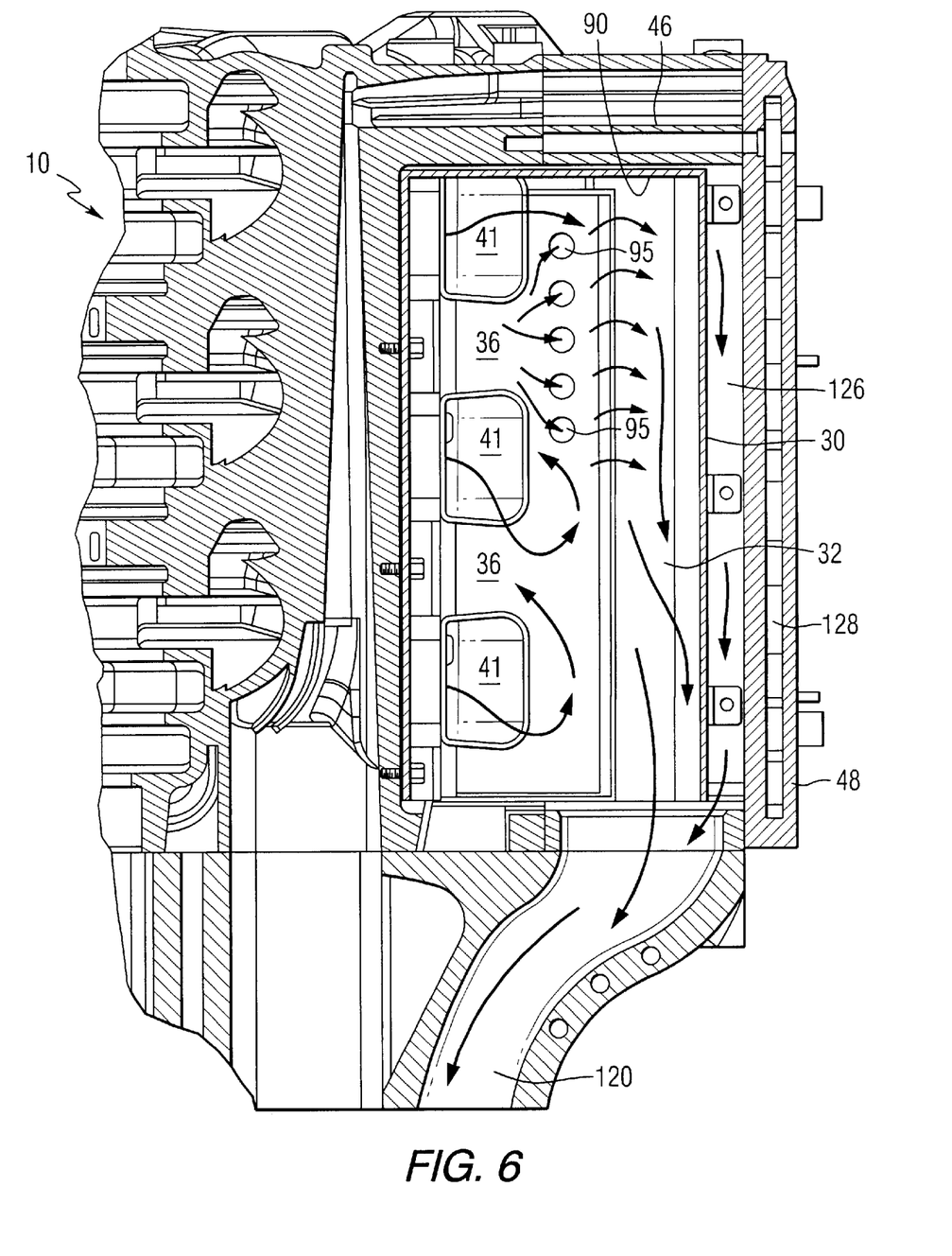
FIG. 6 is a section view taken through the internal combustion engine and the exhaust treatment device of the present invention, showing the path of the exhaust gases through the device.

FIG. 6 is a section view taken through the engine block 10 and the exhaust treatment device 30 to show the internal structure of the exhaust treatment device and to illustrate the path along which the exhaust gases flow. Below the internal combustion engine 10, a driveshaft housing and lower cowl structure is suspended. Part of this structure comprises an exhaust conduit 120 which conducts the exhaust gases to a location below the surface of the body of water in which the marine propulsion system is operated. In the illustration of FIG. 6, the marine propulsion system is an outboard motor. After passing from the exhaust ports of the three cylinders on one side of the V-6 engine construction illustrated in FIG. 1, the exhaust gas flows through the second exhaust inlet conduits 41, of which there are three in this example. The gases then flow within the second inner chamber 36 toward the second end 90 of the exhaust treatment device 30. The second plurality of transfer passages 95, which operate in a manner similar to the first plurality of transfer passages 94 described in conjunction with FIG. 3, and then the exhaust gases flow into the outer chamber 32. In a preferred embodiment of the present invention, the structure of the outer housing around the outer chamber 32 and between the two portions of the outer chamber is not intended to be perfectly impervious to the flow of exhaust gases. As a result, exhaust gases can flow from the outer chamber 32 into the region 126 between the exhaust treatment device 30 and the cover 48 of the liquid cooled housing. From these areas, the exhaust gases flow downward into the exhaust conduit 120.

With continued reference to FIG. 6, reference numeral 128 identifies a water passage in the cover 48 of the liquid cooled housing which is shaped to conduct cooling water. Similar passages are contained within the wall structure 46 of the liquid cooled housing. Water which is drawn from the body of water in which the marine propulsion system is operated is conducted through cooling passages of the engine, affiliated components, the wall portion 46, and the cover 48. This inhibits the transfer of heat from the exhaust treatment device 30 to other components under the cowl of the marine propulsion system. However, the cooling of the liquid cooled housing will naturally cause the outer shell of the outer chamber 32 to be at a temperature which is significantly less than the shell of the first and second inner chambers, 34 and 36. This temperature differential can cause severe thermal expansion and contraction between the inner and outer chambers. In order to facilitate this support system and in order to avoid damage from thermal expansion and contraction, the outer support rail 50 and the first and second inner support rails, 61 and 62, are shaped to receive each other in sliding association. As a result, the expansion and contraction of the first and second inner chambers is accommodated by allowing the first and second inner support rails, 61 and 62, to slide between the parallel surfaces of the outer support rail 50. This prevents damage from occurring due to the stress that would otherwise be created by the expansion and contraction of the first and second inner chambers relative to the outer chamber if a more rigid construction was used.

In certain embodiments of the present invention, the first and second inner chambers, 34 and 36, can be filled with a catalyst material in the form of a porous or fibrous material or pellets. As the hot exhaust gases flow into the first and second inner chambers, 34 and 36, from the first and second exhaust inlet conduits, 40 and 41, the catalyst within the inner chambers can facilitate the appropriate oxidation or reduction of the noxious elements within the exhaust stream. Alternatively, the interior walls of the first and second inner chambers, 34 and 36, can be coated with a catalyst material. However, it should be understood that a catalyst is not required in all embodiments of the present invention. Alternatively, the extreme heat within the first and second inner chambers, 34 and 36, is sufficient to facilitate further oxidation of certain noxious elements within the exhaust gas stream in order to minimize certain pollutant emanating from the marine propulsion system. In engines which employ direct fuel injection, the engines typically operate on a lean and stratified air/fuel mixture, particularly at low engine loads. This provides excess oxygen for post oxidation within the regions of the device that are maintained at significantly elevated temperatures. As a result, no additional oxygen is generally required for this oxidizing process.

With reference to FIGS. 1–6, the exhaust treatment device 30 of the present invention comprises an outer chamber 32 and a first inner chamber 34 contained within the outer chamber 32 and slidably supported by the outer chamber. A first exhaust inlet conduit 40 is disposed in fluid communication with the first inner chamber 34 for directing a flow of exhaust gases into the first inner chamber 34 from a location external to the exhaust treatment device 30, such as from the exhaust ports of one or more cylinders of an internal combustion engine. As a result, the first inner chamber 34 can move relative to the outer chamber 32 in response to changes in temperature difference between the first inner chamber 34 and the outer chamber 32. An outer support rail 50 is attached to the outer chamber 32 and a first inner support rail 61 is attached to the first inner chamber 34 and shaped to be received by the outer support rail 50. The outer support rail and the first inner support rail are configured to cooperate with each other to slidably support the first inner chamber 34 relative to the outer chamber 32. A first plurality of transfer passages 94 are formed as part of the exhaust treatment device 30 to provide fluid communication between the first inner chamber 34 and the outer chamber 32. A liquid cooled housing structure, comprising the wall portion 46 and the cover portion 48, is attached to the internal combustion engine 10. The outer chamber 32 is disposed within a cavity formed within the liquid cooled housing. A first end 70 of the first inner chamber 34 is disposed at a first end 91 of the exhaust treatment device and a second end of the first inner chamber 34 is disposed at a second end 90 of the exhaust treatment device. The outer chamber 32 is disposed in fluid communication with an exhaust conduit 120 of the internal combustion engine at the first end 91 of the exhaust treatment device 30. The first plurality of transfer passages 94 are formed in the wall of the first inner chamber 34 at a location which is closer to the second end 90 of the exhaust treatment device than to the first end 91 of the exhaust treatment device.

In a preferred embodiment of the present invention, it further comprises a second inner chamber 36 contained within the outer chamber 32 and a second inner support rail 62 attached to the second inner chamber 36 and shaped to be received by the outer support rail 50. The outer support rail 50 and the second inner support rail 62 are configured to cooperate with each other to slidably support the second inner chamber relative to the outer chamber. A second plurality of transfer passages 95 are formed as part of the exhaust treatment device to provide fluid communication between the second inner chamber 36 and the outer chamber 32. A second exhaust inlet conduit 41 is disposed in fluid communication with the second inner chamber 36 for directing a flow of exhaust gases into the second inner chamber.

A first end 72 of the second inner chamber 36 is disposed at the first end 91 of the exhaust treatment device and a second end of the second inner chamber 36 is disposed at a second end 90 of the exhaust treatment device. The second plurality of transfer passages 95 are formed in a wall of the second inner chamber 36 at a location which is closer to the second end 90 of the exhaust treatment device than to the first end of the exhaust treatment device. A catalyst can be disposed within the first and second inner chambers, 34 and 36. Although the present invention is particularly well suited for use with two cycle engines because of the way that the first and second chambers can be isolated from each other. This construction avoids deleterious effects on the exhaust system tuning. The present invention is also particularly well suited for use in conjunction with engines that operate with lean air/fuel mixtures, such as direct fuel injected engines. However, the present invention can also be used advantageously with four cycle engines.

Although the present invention has been described in particular detail and illustrated to show one preferred embodiment, it should be understood that alternative embodiments are also within its scope.

We claim:

1. An exhaust treatment device for an internal combustion engine of a marine propulsion system, comprising:

an outer chamber;

a first inner chamber contained within said outer chamber and slidably supported by said outer chamber;

a first exhaust inlet conduit disposed in fluid communication with said first inner chamber for directing a flow of exhaust gases into said first inner chamber from a location external to said exhaust treatment device;

whereby said first inner chamber can move relative to said outer chamber in response to changes in the temperature difference between said first inner chamber and said outer chamber;

a second inner chamber contained within said outer chamber;

a second inner support rail attached to said second inner chamber and shaped to be received by said outer support rail, said outer support rail and said second inner support rail being configured to cooperate with each other to slidably support said second inner chamber relative to said outer chamber;

a second plurality of transfer passages formed as part of said exhaust treatment device to provide fluid communication between said second inner chamber and said outer chamber;

a second exhaust inlet conduit disposed in fluid communication with said second inner chamber for directing a flow of exhaust gases into said second inner chamber;

a first end of said second inner chamber is disposed at said first end of said exhaust treatment device;

a second end of said second inner chamber is disposed at said second end of said exhaust treatment device; and said second plurality of transfer passages are formed in a wall of said second inner chamber at a location which is closer to said second end of said exhaust treatment device than said first end of said exhaust treatment device.

2. The exhaust treatment device of claim 1, further comprising:

a catalyst disposed within said first and second inner chambers.

3. The exhaust treatment device of claim 1, further comprising:

an outer support rail attached to said outer chamber;

a first inner support rail attached to said first inner chamber and shaped to be received by said outer support rail, said first outer and inner support rails being configured to cooperate with each other to slidably support said first inner chamber relative to said outer chamber; and a first plurality of transfer passages formed as part of said exhaust treatment device to provide fluid communication between said first inner chamber and said outer chamber.

4. The exhaust treatment device of claim 3, further comprising:

a liquid cooled housing attached to said internal combustion engine, said outer chamber being disposed within a cavity formed within said liquid cooled housing.

5. The exhaust treatment device of claim 2, wherein:

a first end of said first inner chamber is disposed at a first end of said exhaust treatment device;

a second end of said first inner chamber is disposed at a second end of said exhaust treatment device; and said outer chamber is disposed in fluid communication with an exhaust conduit of said internal combustion engine at said first end of said exhaust treatment device; and said first plurality of transfer passages are formed in said wall of said first inner chamber at a location which is closer to said second end of said exhaust treatment device than said first end of said exhaust treatment device.

6. An exhaust treatment device for an internal combustion engine of a marine propulsion system, comprising:

an outer chamber;

a first inner chamber contained within said outer chamber;

a first exhaust inlet conduit disposed in fluid communication with said first inner chamber for directing a flow of exhaust gases into said first inner chamber from a location external to said exhaust treatment device;

an outer support rail attached to said outer chamber;

a first inner support rail attached to said first inner chamber and shaped to be received by said outer support rail, said first outer and inner support rails being configured to cooperate with each other to slidably support said first inner chamber relative to said outer chamber;

a first plurality of transfer passages formed as part of said exhaust treatment device to provide fluid communication between said first inner chamber and said outer chamber;

a first end of said first inner chamber is disposed at a first end of said exhaust treatment device;

a second end of said first inner chamber is disposed at a second end of said exhaust treatment device; and said outer chamber is disposed in fluid communication with an exhaust conduit of said internal combustion engine at said first end of said exhaust treatment device; and said first plurality of transfer passages are formed in said wall of said first inner chamber at a location which is closer to said second end of said exhaust treatment device than said first end of said exhaust treatment device.

7. The exhaust treatment device of claim 6, further comprising:

a liquid cooled housing attached to said internal combustion engine, said outer chamber being disposed within a cavity formed within said liquid cooled housing.

8. The exhaust treatment device of claim 7, wherein:

said liquid cooled housing comprises a four-sided structure which is attached to said internal combustion engine and a cover member attached to said four-sided structure, said four-sided structure and said cover member have liquid passages formed therein to conduct liquid in thermal communication with said liquid cooled housing.

9. The exhaust treatment device of claim 6, wherein:

said exhaust inlet conduit extends through said outer chamber to direct a flow of exhaust gas into said first inner chamber from an exhaust port of an internal combustion engine.

10. The exhaust treatment device of claim 9, further comprising:

a second inner chamber contained within said outer chamber; and a second inner support rail attached to said second inner chamber and shaped to be received by said outer support rail, said outer support rail and said second inner support rail being configured to cooperate with each other to slidably support said second inner chamber relative to said outer chamber.

11. The exhaust treatment device of claim 10, wherein:

a divider wall disposed between said first and second inner chambers.

12. The exhaust treatment device of claim 10, further comprising:

a second plurality of transfer passages formed as part of said exhaust treatment device to provide fluid communication between said second inner chamber and said outer chamber.

13. The exhaust treatment device of claim 10, wherein:

a second exhaust inlet conduit disposed in fluid communication with said second inner chamber for directing a flow of exhaust gases into said second inner chamber.

14. The exhaust treatment device of claim 10, wherein:

a first end of said second inner chamber is disposed at said first end of said exhaust treatment device;

a second end of said second inner chamber is disposed at said second end of said exhaust treatment device; and said second plurality of transfer passages are formed in a wall of said second inner chamber at a location which is closer to said second end of said exhaust treatment device than said first end of said exhaust treatment device.

15. The exhaust treatment device of claim 10, further comprising:

a catalyst disposed within said first and second inner chambers.

16. An exhaust treatment device for an internal combustion engine of a marine propulsion system, comprising:

an outer chamber;

a first inner chamber contained within said outer chamber;

a first exhaust inlet conduit disposed in fluid communication with said first inner chamber for directing a flow of exhaust gases into said first inner chamber from a location external to said exhaust treatment device;

an outer support rail attached to said outer chamber;

a first inner support rail attached to said first inner chamber and shaped to be received by said outer support rail, said first outer and inner support rails being configured to cooperate with each other to slidably support said first inner chamber relative to said outer chamber;

a first plurality of transfer passages formed as part of said exhaust treatment device to provide fluid communication between said first inner chamber and said outer chamber;

a liquid cooled housing attached to said internal combustion engine, said outer chamber being disposed within a cavity formed within said liquid cooled housing;

a second inner chamber contained within said outer chamber;

a second inner support rail attached to said second inner chamber and shaped to be received by said outer support rail, said outer support rail and said second inner support rail being configured to cooperate with each other to slidably support said second inner chamber relative to said outer chamber, a first end of said first inner chamber being disposed at a first end of said exhaust treatment device, a second end of said first inner chamber being disposed at a second end of said exhaust treatment device, said outer chamber being disposed in fluid communication with an exhaust conduit of said internal combustion engine at said first end of said exhaust treatment device, said first plurality of transfer passages are formed in said wall of said first inner chamber at a location which is closer to said second end of said exhaust treatment device than said first end of said exhaust treatment device, said exhaust inlet conduit extending through said outer chamber to direct a flow of exhaust gas into said first inner chamber from an exhaust port of an internal combustion engine, a divider wall being disposed between said first and second inner chambers;

a second plurality of transfer passages formed as part of said exhaust treatment device to provide fluid communication between said second inner chamber and said outer chamber; and a second exhaust inlet conduit disposed in fluid communication with said second inner chamber for directing a flow of exhaust gases into said second inner chamber, a first end of said second inner chamber being disposed at said first end of said exhaust treatment device, a second end of said second inner chamber being disposed at said second end of said exhaust treatment device, said second plurality of transfer passages being formed in a wall of said second inner chamber at a location which is closer to said second end of said exhaust treatment device than said first end of said exhaust treatment device.

17. The exhaust treatment device of claim 16, wherein:

said liquid cooled housing comprises a four-sided structure which is attached to said internal combustion engine and a cover member attached to said four-sided structure, said four-sided structure and said cover member have liquid passages formed therein to conduct liquid in thermal communication with said liquid cooled housing.

18. The exhaust treatment device of claim 17, further comprising:

a catalyst disposed within said first and second inner chambers.

* * * * *